(12) United States Patent
Sander

(10) Patent No.: US 6,182,527 B1
(45) Date of Patent: Feb. 6, 2001

(54) LATCHING ELEMENT

(75) Inventor: Edmund Sander, Leonberg (DE)

(73) Assignee: Dr. Ing. h.C.F. Porsche AG, Weissach (DE)

( * ) Notice: Under 35 U.S.C. 154(b), the term of this patent shall be extended for 0 days.

(21) Appl. No.: 09/346,580

(22) Filed: Jul. 2, 1999

(30) Foreign Application Priority Data

Jul. 22, 1998 (DE) .............................. 198 32 868

(51) Int. Cl.⁷ .............................. G05G 5/06; B60K 20/04
(52) U.S. Cl. .................. 74/529; 74/473.21; 192/220.4; 29/527.4
(58) Field of Search .................. 74/529, 576, 473.21, 74/473.22, 473.23; 192/220.2, 220.3, 220.4; 292/341.12, DIG. 56; 29/527.2, 527.4

(56) References Cited

U.S. PATENT DOCUMENTS

| | | | |
|---|---|---|---|
| 4,358,141 | * 11/1982 | Hamada | 292/216 |
| 4,783,103 | * 11/1988 | Schlegel | 292/216 |
| 4,905,802 | * 3/1990 | Gotoh | 192/220.4 X |
| 5,314,049 | * 5/1994 | Nordstrom | 192/220.7 X |
| 5,348,357 | * 9/1994 | Konchan et al. | 292/216 |
| 5,642,636 | * 7/1997 | Mitsui | 292/216 X |

FOREIGN PATENT DOCUMENTS 72 26 376   7/1973  (DE) .

* cited by examiner

Primary Examiner—Richard M. Lorence
(74) Attorney, Agent, or Firm—Evenson, McKeown, Edwards & Lenahan, P.L.L.C.

(57) ABSTRACT

A latching element is used for locking a selector lever in vehicles, with the latching element consisting of at least two flat elements. In order to accept high forces, and be manufactured at low-cost and to exhibit reduced noise generation in conjunction with other latching parts, the first of the flat elements is injection-coated at least areawise with elastic material and the other flat elements are coupled with the first element by the elastic material.

16 Claims, 2 Drawing Sheets

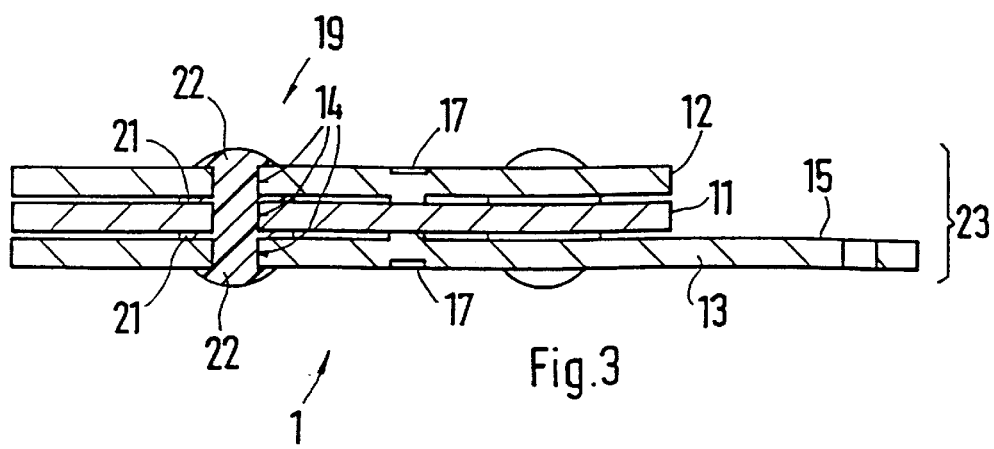
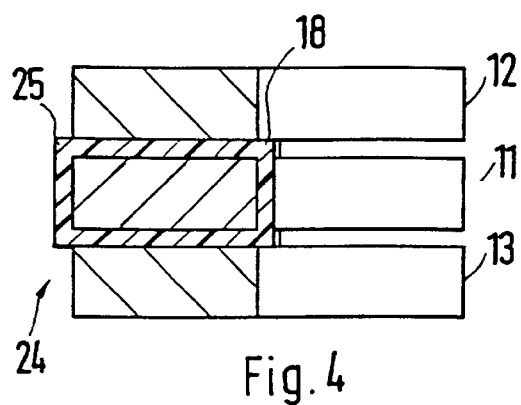
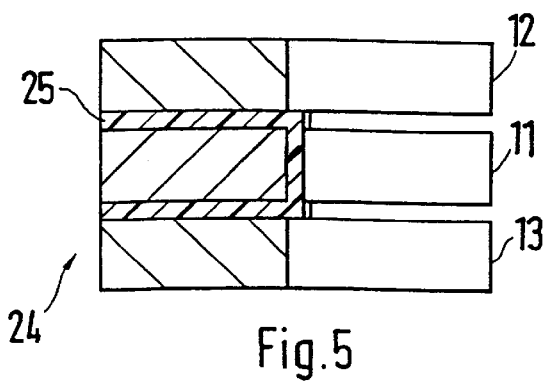
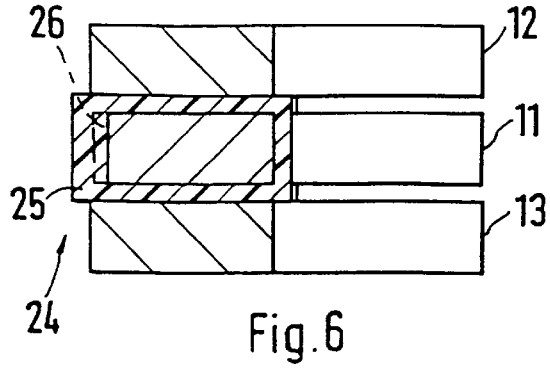
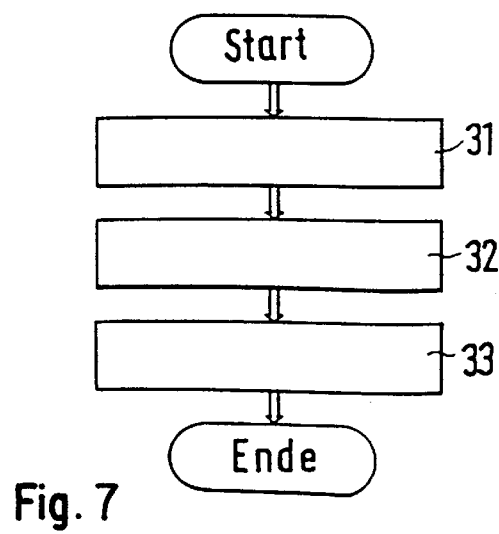

LATCHING ELEMENT

BACKGROUND AND SUMMARY OF THE INVENTION

This application claims the priority of German Application No. 198 32 868.0, filed Jul. 22, 1998, the disclosure of which is expressly incorporated by reference herein.

The invention relates to a latching element like that which can be used, for example, for locking a selector lever in vehicles, a method for manufacturing such a latching element, and the use of the latching element.

Latching elements can have comparatively large structural volumes when the latching forces received and transmitted reach a certain magnitude. Thus, for example in a latching element used in conjunction with a selector lever in a vehicle, latching forces on the order of 1500 N are developed with a force of 300 N to be latched at the lever.

To transmit such high latching forces, the material cross section of a latching element must be increased. This has the disadvantage that such a latching element is difficult to manufacture; for example, manufacturing a latching element of this kind is economically possible only up to a certain thickness of the sheet metal. In addition, finishing work is required because thick parts cannot be punched with the same precision as thin parts. A multilayer latching element of this kind is already known from a key lock device used in vehicles of the Porsche 964 Tiptronic model.

If the latching element is made of metal, there is also the problem that when the latching element strikes other latching parts, such as a latching pawl, an impact or other similar noises are generated.

It is thus the goal of the present invention to provide a latching element that is suitable for accepting high forces, can be manufactured at low assembly cost, and exhibits reduced noise development in conjunction with additional latching parts.

This goal is achieved according to the present invention by providing a latching element consisting of at least two flat elements, characterized in that the first element is injection-coated at least areawise with elastic material and the other elements are coupled with the first element by the elastic material. A method for making latching elements includes the steps of injection coating a blank for a first flat element with elastic material; applying other elements; and fastening the other elements by compressing the elastic material. An especially advantageous application of the present invention is proposed in which the novel latching element is used in a selector lever.

According to the invention, it is proposed for a device technology solution to this prior art problem to make the latching element consist of at least two flat elements. The first element is injection-coated at least areawise with elastic material, and other elements are coupled with the first element by the elastic material. The fact that the latching element is assembled from a plurality of flat elements reduces assembly cost, since the individual flat elements are thinner and therefore much simpler to manufacture. In addition, a latching element of this kind can be adapted especially simply to the latching forces that develop, with the number of flat elements of which the latching element is composed being variable. By injection-coating a first flat element with elastic material, the individual flat elements do not abut one another directly, but are decoupled by the elastic material. The other flat elements are connected with the first flat element by means of the elastic material, so that no additional connecting means are required. The elastic material produces a significant noise reduction both by damping the impact upon contact with additional latching parts and also by decoupling the individual flat elements. Moreover, the elastic coupling of flat elements has the advantage that the individual flat elements can align themselves with respect to one another so that the latching force is distributed over all of the flat elements and, hence, is received without force peaks. The flat elements are self-aligning. The first element does not have to be injection-coated over the entire surface but it is sufficient instead if this is performed areawise to the extent necessary on the contact surfaces and also in specified areas that are intended for coupling with the other flat elements.

Advantageous improvements on the latching element are described herein.

Thus, the elastic material used as the coupling element passes through the other elements. With this type of coupling of the flat elements with one another, only the first flat element need be injection-coated, while the other elements are coupled with the first flat element by the elastic material. This coupling can be performed for example by shapewise connection (undercutting, latching, etc.) or by compressing the elastic material.

It is also contemplated to provide means for limiting elastic deformation. Since elastic material can be applied to the first flat element only with a material-dependent minimum layer thickness, as a result of the thickness of the elastic material, an inadmissibly high deformation travel results between the individual flat elements under high loads. It is proposed to provide means for limiting the elastic deformation that can be applied to one or to all of the flat elements.

Together with the other latching parts, the contact surfaces of the latching element serve to latch the latching element. Regarding the contact surfaces, a portion of the contact surfaces is not injection-coated. This applies in particular to contact surfaces that cooperate with other latching parts as latching pawls. In this case, it is not desirable to accept even higher latching forces under the circumstances that an elastic material is applied between the surfaces that transfer the latching force. Moreover, the noise that results when a metallic latching pawl contacts the metal latching surface can be used to indicate acoustically the engagement of the latching pawl.

Another design of the contact surfaces provides that the first flat element, injection-coated with elastic material, has a recess in the area of the contact surface that is set back relative to the other flat element in the vicinity of this contact surface. The first flat element is injection-coated with elastic material in the vicinity of the contact surface in such fashion that the elastic material projects beyond the surface that contacts the other elements. In this design, an elastic stop is formed on the injected flat element, said stop projecting beyond the contact surface formed on the other flat elements. An engaging latching part thus first contacts this elastic stop and any impact of the latching part is damped. If the forces acting under these circumstances are high enough, the elastic stop will be deformed to the point where the latching part abuts the contact surfaces formed on the other flat elements. Further deformation of the elastic stop is now no longer possible; on the other hand, the elastic stop cannot be destroyed since the recess provided in the injected flat element offers sufficient space to receive the deformed elastic stop without the latter being inadmissibly deformed.

The method for manufacturing latching elements according to the invention, in a first step, comprises the injection of the first flat element with elastic material. In a second step, the other flat elements are then placed on the first flat element. If necessary, in the final step all of the flat elements can be connected into a packet by compressing the elastic material that passes through the other elements.

Regarding the injection of the first flat element, in an improvement on the manufacturing method, it is proposed to produce the recess inside the injection coating by leaving it open during the injection coating process. Alternatively, it is proposed to produce a recess of this kind only after injection coating, for example by removing the injected material.

Since only the first element is injection-coated with elastic material, the stop surfaces injection-coated with elastic material are effective only in the event that the elastic material is applied. It is only when the force acting on the stop surface is so high that the elastic material is pushed away that the other elements besides the first element continue to support and accept the latching force.

The use of the latching element according to the invention is especially advantageous in a selector lever like that provided conventionally in a motor vehicle for operating an (automatic) transmission. Since a selector lever of this kind is located in the interior of a vehicle, noises emanating from such a selector lever can be heard especially clearly and therefore are especially annoying. It is also advantageous if the latching element is used to lock the selector lever, since latching elements in selector levers normally have the task of providing protection against misuse of the vehicle, possibly against theft. The forces developed at the selector lever under these conditions can be very high and are further reinforced by the prevailing geometric conditions (lever arm of selector lever). This applies in particular when the latching element is connected directly with the selector lever.

Other objects, advantages and novel features of the present invention will become apparent from the following detailed description of the invention when considered in conjunction with the accompanying drawings.

BRIEF DESCRIPTION OF THE DRAWINGS

FIG. 3 is a sectional view taken along line III—III in FIG. 2;

FIG. 4 shows a first design for a stop surface of the latching element in a section along line IV—IV in FIG. 2;

FIG. 5 is a second design of the stop surface on the latching element;

FIG. 6 is a third design of the stop surface on the latching element; and

FIG. 7 is a flowchart of a method according to the invention for producing a latching element.

DETAILED DESCRIPTION OF THE DRAWINGS

Figure 1:
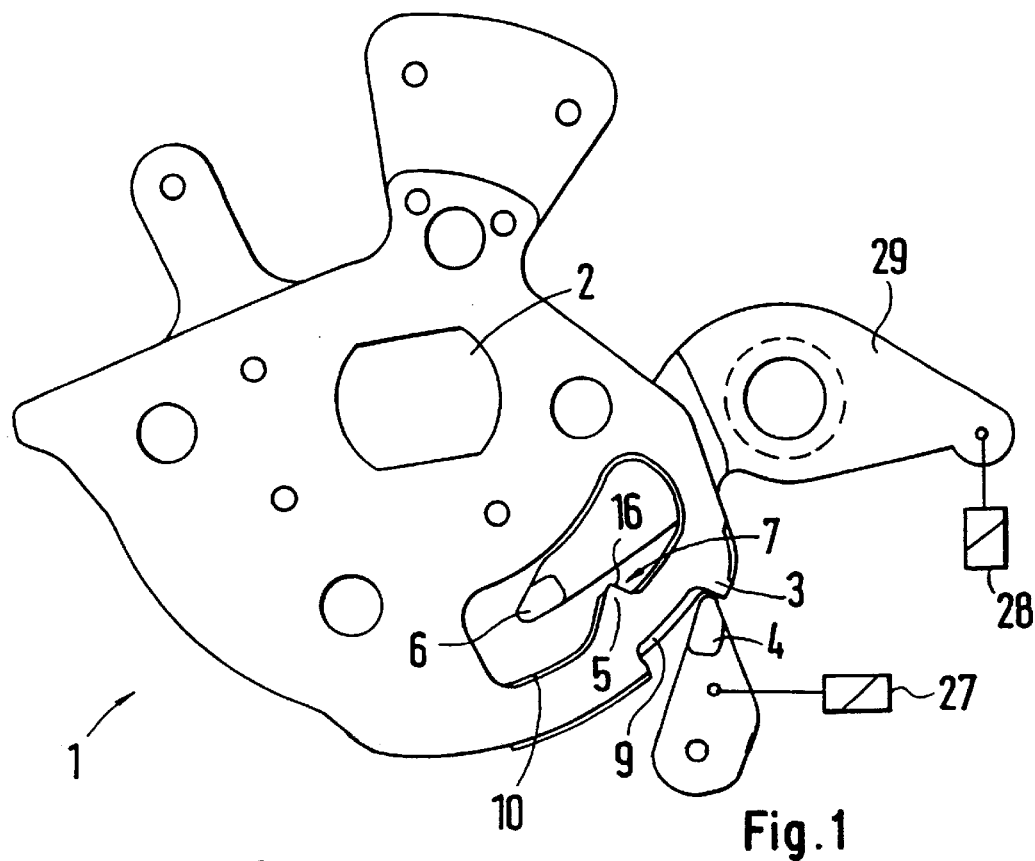
FIG. 1 is a view of a latching element according to the invention in position P.

The latching element 1 shown in FIG. 1 is located inside a housing (not shown) of a selector lever for operating a motor vehicle automatic transmission. Latching element 1 is nonrotatably connected with the selector lever (not shown) by a central recess 2. A first stop 3 is provided at the edge of latching element 1, said stop cooperating with a pawl 4 located integrally with the housing. Inside latching element 1 is a second stop 5 in a recess, said stop cooperating in the vicinity of stop surface 7 with a latching pawl 6 fastened to the housing. While the first stop 3 is formed completely by a first layer 9 of elastic material, a second layer 10 of elastic material mounted on second stop 5 has an interruption 16 in the vicinity to stop surface 7.

Pawl 4 is actuated by a first electromagnet 27; when the electromagnet 27 is not energized, pawl 4 is in the engagement position shown in FIG. 1. A second electromagnet 28 is provided for actuating latching pawl 6. Latching pawl 6, in the non-energized state of second electromagnet 28, assumes the resting position shown in FIG. 1. Pawl 4 and latching pawl 6 need not necessarily be made as separate parts; therefore it is equally possible to mount pawl 4 on a support 29 for latching pawl 6.

FIG. 1 shows latching element 1 in position P of the selector lever. For safety reasons, the selector lever should be able to be moved out of this (end) position only when a service brake of the vehicle is actuated. In the engagement position shown, pawl 4 latches latching element 1 and hence the selector lever in which the stop 3 of latching element 1 is supported on the housing by pawl 4. To unlock pawl 4 and hence latching element 1, electromagnet 27 must be energized. In the present case this is accomplished by connecting electromagnet 27 with a brake light contact (not shown) and then energizing it when the service brake of the vehicle is actuated.

Figure 2:
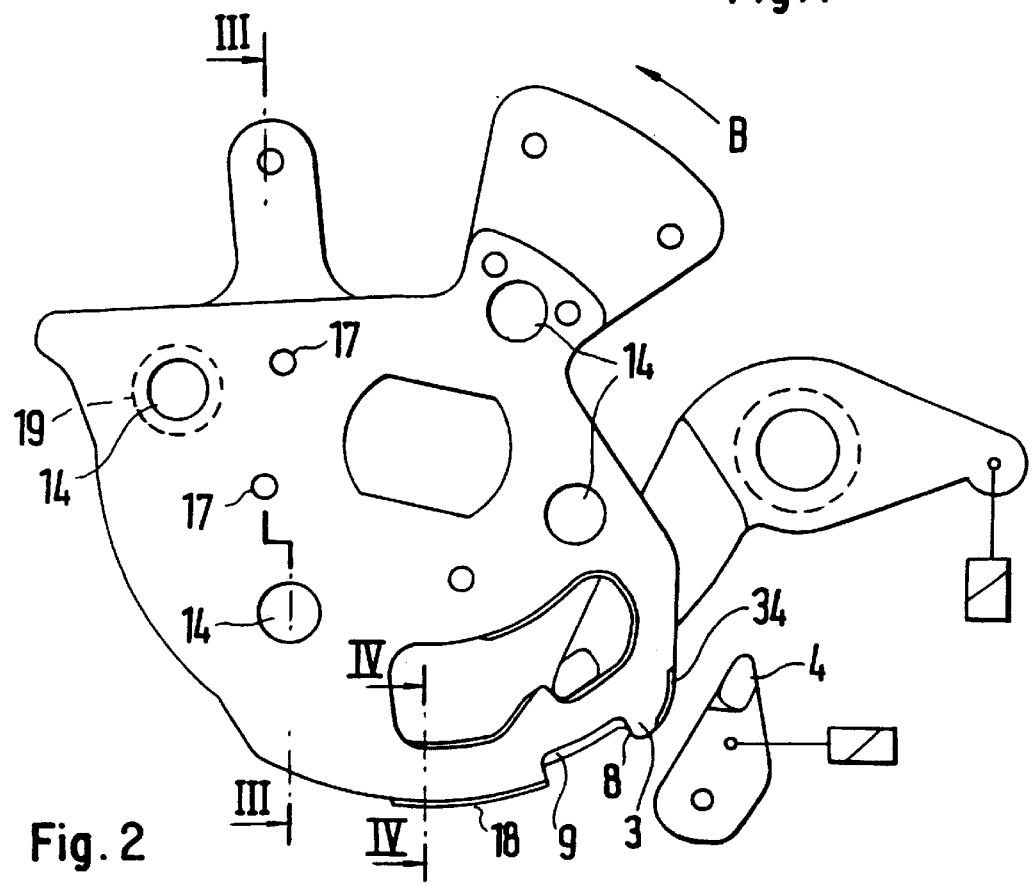
FIG. 2 is a view of a latching element according to the invention in position N.

In contrast to FIG. 1, FIG. 2 shows latching element 1 in position N of the selector lever. According to another safety function, the selector lever must be prevented from being moved from position N (=neutral) into position R (=reverse) as long as the vehicle is in motion. To perform this function, the second electromagnet 28 is energized when a speed value greater than 3 km/hour exists. In this case, latching pawl 6 is in the engagement position shown in FIG. 2 and, together with the second stop 5, prevents latching element 1 from moving in the direction of arrow B beyond the position shown.

As can be seen better in FIG. 3, latching element 1 consists of a plurality of flat elements, in this case three disks 11 to 13. The three disks 11 to 13 uniformly have stops 3 and 5, central recess 2 (see FIG. 1), and holes 14. The bottom disk 13 is additionally provided with a projection 15.

The outer disks 12 and 13, as an additional feature by comparison with the middle disk 11, have embossed points 17 that are applied in the direction of middle disk 11. Alternatively, it is also possible to provide similar embossed points on middle disk 11.

In contrast to the outer disks 12 and 13, the middle disk 11 has an injection coating 18 (see FIGS. 4–6) made of elastic material that forms the elastic layers 9 and 10 and extends between stops 3 and 5. On the other hand, a second injection coating 19 (indicated in FIG. 2 only by dashed lines, otherwise see FIG. 3) is provided on top of latching element 1 into the holes 14 in each case and extends over all three disks 11 to 13, essentially forming a central rod 20 on which other elements 21 are formed to the right and left of the middle disk 11. Rod 20 extends through the holes 14 in the outer disks 12 and 13 and is pressed against them externally to form a head 22 similar to a rivet head, by heating. The disks 11 to 13 are best connected with interposition of buffer elements 21 or rod 20 and heads 22 to form a disk packet 23.

Both the first injection coating 18 and the buffer 21 serve for spacing the outer disks 12 and 13 from the middle disk 11 with interposition of the elastic material used to form injection coatings 18, 19. Disks 11 to 13 are thus decoupled from one another in each case. In addition, the movement possibilities of disks 11 to 13 with respect to one another are limited by embossments 17.

Since pawl 4 on first stop 3 always strikes the first layer 9, the elastic material is effective even when the pawl 4 strikes a stop surface 8 and suppresses possible noises. The forces developed at first stop 3, because the first layer 9 is connected only with the middle disk 11 by the first injection coating 18, initially is transmitted only by the middle disk 11. It is only when the forces to be transmitted are so great that the first layer 9 is compressed in the vicinity of stop surface 8 that the outer disks 12 and 13 also transmit.

The situation is slightly different for latching pawl 6 that abuts the second stop surface 7. No elastic material is present on the second stop surface 7 in the vicinity of interruption 16; for this purpose, the second stop surface 7 is not injection-coated at all (or alternatively the elastic material is removed in this area). The second stop surface 7 is thus in direct contact with latching pawl 6. This results in a damped yet audible noise when the latching pawl 6 strikes stop surface 7. In addition, all three disks 11 to 13 always contribute to force transmission in the vicinity of stop surface 7.

The possible designs of a stop surface 24 are shown in FIGS. 4 to 6 using the example of a sectional view taken along line IV—IV of FIG. 2. The design of stop surface 24 as shown in FIG. 4 corresponds to stop surface 8. The middle disk 11 is covered completely with an injection coating 25 made of elastic material in the area of stop surface 24. In this design, injection coating 25 serves as the only elastic stop for the latching element. Cooperation of the outer disks 12 and 13 is provided only for the case of misuse in which the acting forces destroy injection coating 25.

The design of stop surface 24 according to FIG. 5 corresponds to stop surface 7. In this case, injection coating 25 is provided only between the middle disk 11 and the outer disks 12 and 13; a flush termination of injection coating 25 at disks 11 to 13 is not necessary. A latching element that cooperates with stop surface 24 is therefore always in contact with all three disks 11 to 13. As a result of the elastic coupling of disks 11 to 13 by injection coating 25, the latter is able to compensate for tolerances and tilting relative to the latching element so that all three disks 11 to 13 contribute uniformly to the transmission of force.

The third design of the stop surface 24 according to FIG. 6 corresponds to the design according to FIG. 3, with the middle disk 11 having a recess 26 in the vicinity of stop surface 24. Recess 26 is filled by injection coating 25. When a latching element engages, the elastic injection coating 25 initially acts as an elastic stop. If the forces acting between the latching element and a stop surface 24 increase, the injection coating 25 is deformed until the latching element abuts the outer disks 12 and 13. Recess 26 ensures that injection coating 25 can deform elastically even in the area of the middle disk 11 without being destroyed in the process. In this design, injection coating 25 serves as an elastic stop for the impact of the latching elements; for transmission of the latching forces, injection 25 is shaped around the recess so that the outer disks 12 and 13 abut the latching element.

An additional elastically injected stop surface 34 is provided on the back of stop 3. This stop surface 2 serves as a noise-damping stop for pawl 4 when pawl 4 falls back into its starting position with the latching element 1 outside the (end) position P according to FIG. 1.

The process for making the above-described latching element is disclosed with respect to FIG. 7. In the first step 31, the middle disk is provided with injections 18 and 19. In the second step 32, the outer disks 12, 13 are placed on the middle disk 11 with rods 20 being inserted through holes 14 of outer disks 12 and 13. In the third and final step 33, rods 20 are pressed endwise with heating and thus contact disks 11 to 13 to form a disk packet 23.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Latching element, comprising:
   a first flat latching part having an injection-coating of an elastic material at least over defined areas;
   additional flat latching parts, said additional flat latching parts coupling with said first part via the elastic material.

2. The latching element according to claim 1, wherein said elastic material passes through openings formed in the additional parts.

3. The latching element according to claim 1, further comprising means for limiting elastic deformation arranged on at least one of said parts.

4. The latching element according to claim 2, further comprising means for limiting elastic deformation arranged on at least one of said parts.

5. The latching element according to claim 1, wherein said first and additional flat latching parts are made of metal and include stop surfaces, a portion of said stop surfaces being free of the elastic material.

6. The latching element according to claim 2, wherein said first and additional flat latching parts are made of metal and include stop surfaces, a portion of said stop surfaces being free of the elastic material.

7. The latching element according to claim 3, wherein said first and additional flat latching parts are made of metal and include stop surfaces, a portion of said stop surfaces being free of the elastic material.

8. The latching element according to claim 1, further comprising stop surfaces formed on said first and additional flat latching parts, at least one stop surface being formed on said first flat latching part having a recess in an area of the stop surface and being injection-coated with the elastic material, said additional flat latching parts not being injection-coated in the area of said one stop surface, wherein said elastic material on said first flat latching part projects beyond the stop surfaces of the additional flat latching parts.

9. The latching element according to claim 2, further comprising stop surfaces formed on said first and additional flat latching parts, at least one stop surface being formed on said first flat latching part having a recess in an area of the stop surface and being injection-coated with the elastic material, said additional flat latching parts not being injection-coated in the area of said one stop surface, wherein said elastic material on said first flat latching part projects beyond the stop surfaces of the additional flat latching parts.

10. The latching element according to claim 3, further comprising stop surfaces formed on said first and additional flat latching parts, at least one stop surface being formed on said first flat latching part having a recess in an area of the stop surface and being injection-coated with the elastic material, said additional flat latching parts not being injection-coated in the area of said one stop surface, wherein said elastic material on said first flat latching part projects beyond the stop surfaces of the additional flat latching parts.

11. The latching element according to claim 1, further comprising a lever coupled with said latching element, said lever and said latching element forming a selector lever.

12. The latching element according to claim 11, wherein said latching element is used to lock the selector lever in a desired position.

13. The latching element according to claim 11, further comprising:

a housing of the selector lever;

at least one latching pawl mounted on said housing; and wherein said latching element coupled with the selector lever cooperates with said at least one latching pawl.

14. A method for manufacturing a latching element, the method comprising the acts of:

injection coating a blank for a first flat part with an elastic material;

applying additional flat parts to said first flat part; and fastening said additional flat parts by compressing the elastic material to form the latching element.

15. The method according to claim 14, further comprising the act of producing an uncoated portion in the injection-coated area of the first flat part by leaving it free from the injection-coating process.

16. The method according to claim 14, further comprising the act of producing an uncoated portion in the injection-coated area on the first flat part by removing the elastic material following the injection-coating.

\* \* \* \* \*